Dec. 11, 1962  R. S. BROWN ET AL  3,068,367
PULSE TRAIN GAP DETECTOR CIRCUITRY
Filed Sept. 8, 1959  2 Sheets-Sheet 1

INVENTORS.
ROBERT S. BROWN
ROLAND YII
BY
James J. Ward
ATTORNEY

INVENTORS.
ROBERT S. BROWN
ROLAND Yii
BY
*James J. Wood*
ATTORNEY

United States Patent Office 3,068,367
Patented Dec. 11, 1962

3,068,367
PULSE TRAIN GAP DETECTOR CIRCUITRY
Robert S. Brown, Elverson, and Roland Yii, West Chester,
Pa., assignors to Burroughs Corporation, Detroit, Mich.,
a corporation of Michigan
Filed Sept. 8, 1959, Ser. No. 838,547
3 Claims. (Cl. 307—88.5)

This invention relates to an improved pulse train gap detection circuitry.

In the digital computer art there is the perennial problem of monitoring the various operations which are performed in order to ascertain whether these operations have been successfully completed. If the answer is in the negative, obviously then remedial steps must be taken in order to correct the condition.

One detection technique, which is sometimes utilized, is to develop a train of signal pulses which are applied to detection circuit means. If the train of pulses continues to arrive within a predetermined time interval, then the detection circuit has one recognizable output. On the other hand, if the predetermined time interval is reached without the reception of a signal pulse, then the detection circuitry delivers another output pulse signal which is indicative that something is wrong. The instant invention is addressed to this type of detection circuitry.

In accordance with a preferred embodiment, there is provided improved pulse train gap detection circuitry comprising in combination, first and second amplifying means each having an input and an output, the input of the first amplifying means being adapted to receive a train of pulse signals. Coupling means connect the output of the first amplifying means with the input to the second amplifying means. Timing circuit means are provided for yieldingly arresting the decay of the signal amplitude to the second amplifying means to inhibit a change in conduction thereof as a function of the time width between successive pulses.

Accordingly it is an object of this invention to provide an improved circuitry for detecting a pulse train gap over a wide time interval.

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

In the following detailed description, had with reference to the accompanying drawings, like reference characters will be used to designate corresponding parts throughout the several figures.

Figure 1:
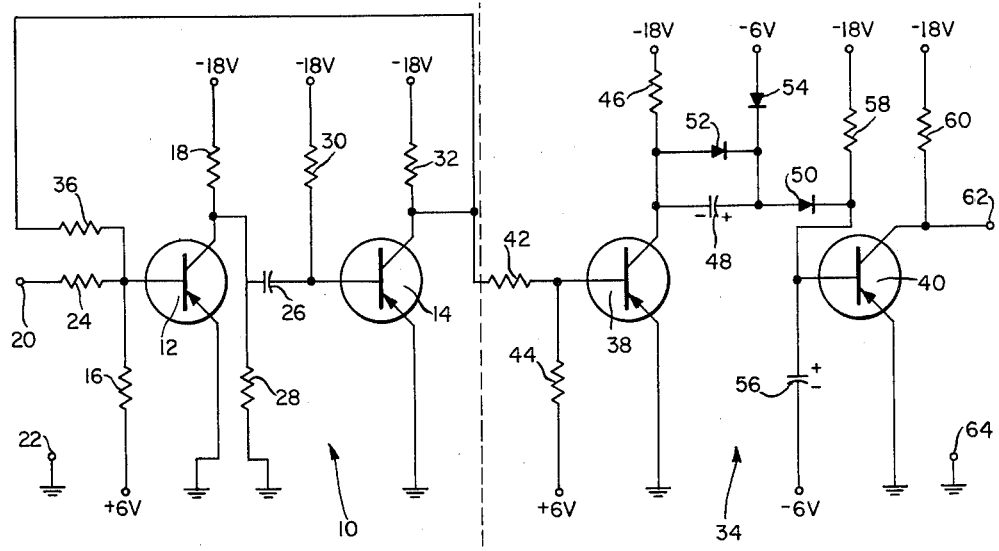
FIG. 1 is a circuit diagram of an improved pulse train gap detector in accordance with one illustrative embodiment of the invention.

Referring now to FIG. 1, a pulse stretcher is indicated generally at 10. This portion of the circuitry comprises a pair of transistors 12, 14, arranged in the common emitter configuration. Biasing potentials for the base and collector of transistor 12 are applied from the indicated battery sources by means of resistors 16 and 18 respectively. The input signals are applied to the circuitry by means of input terminals 20, 22, the latter being grounded. The input to the base of transistor 12 is transmitted by means of resistor 24 which is connected at one end to the input terminal 20.

The output of the transistor 12, developed at the collector, is applied by means of capacitor 26 to the base of transistor 14. A resistor 28 is connected between the collector of transistor 12 and ground. Biasing potentials for the base and collector of transistor 14 are applied by means of resistors 30 and 32 respectively. The output of the pulse stretcher 10 is developed between the collector of transistor 14 and ground, and is applied to the time gap signal stage indicated generally at 34. The collector signal of transistor 14 is also fed back to the base of transistor 12 by means of a feedback loop which includes a resistor 36.

The time gap signal stage 34 comprises a pair of transistors 38, 40, arranged in the common emitter configuration. The output from the collector of transistor 14 is fed to the base of transistor 38 through resistor 42. Biasing potentials for the base and collector of transistor 38 are applied through resistors 44 and 46 respectively. The collector output of transistor 38 is coupled to the base of transistor 40 through a capacitor 48 and a diode 50, arranged in series relationship, with the positive side of the capacitor 48 connected to the anode of diode 50. In those applications where long time delay detection is required, large capacitance is demanded of capacitor 48. Accordingly capacitor 48 may advantageously be of the electrolytic type as shown in FIG. 1. When capacitor 48 is electrolytic, it is shunted by safety diode 52, the anode of which is connected to the negative side of the electrolytic capacitor 48. A clamping diode 54 is connected between a source of negative potential (—6 v.) and the positive side of electrolytic capacitor 48, the anode side of the diode 54 being connected to the negative potential source. An electrolytic capacitor 56 is connected with its positive side to the base of transistor 40 and its negative side to a source of negative potential (—6 v.). For similar reasons, as discussed in connection with component 48, capacitor 56 may or may not be of the electrolytic type. Biasing potentials for the base and collector of transistor 40 are applied by means of resistors 58 and 60. The output of the circuitry is developed across output terminals 62 and 64, the latter terminal being grounded.

Figure 2:
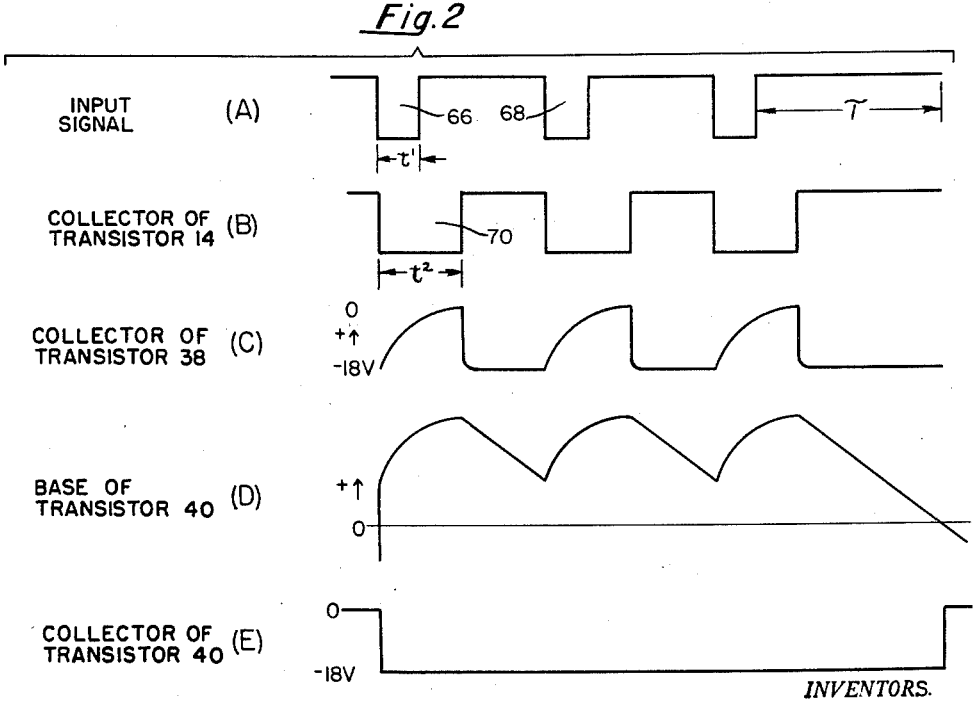
FIG. 2 is a number of voltage waveforms used in explaining the operation of FIG. 1.

The operation of the circuitry of FIG. 1 may best be understood by reference to the voltage waveforms shown in FIG. 2. A negative pulse signal 66 (FIG. 2(A)) is applied at input terminals 20 and 22. This pulse 66 is a function of some operation which has been performed by the computer. When the next operation is completed, a second pulse 68 will be delivered to the input terminals, etc.

The negative going pulse 66 which is applied to the base of transistor 12 causes it to conduct, resulting in a positive going pulse appearing at the collector of transistor 12.

Transistor 14 is normally on, so that capacitor 26 is charged to some potential, with the capacitor plate which is connected to the base of transistor 14 having a negative potential with respect to ground. Since the charge in a capacitor cannot charge instantly, the rise in potential of the collector of transistor 12 is translated into the application of a positive going pulse to the base of transistor 14, and the collector of this latter transistor develops a negative going pulse as indicated in FIG. 2(B). As may be seen from this voltage waveform, the output pulse 70 has a greater time-width than the input pulse 66 i.e. $t_2 > t_1$, so that effectively it has been "stretched." The increased time width is a function of the time constant of capacitor 26 and resistor 30. The voltage pulse 70 is applied through resistor 42 to the base of transistor 38. The collector voltage of transistor 38 is a function of time as shown in FIG. 2(C).

The electrolytic capacitor 48 in the quiescent state is charged to |12 v.|; the electrolytic capacitor 56 in the quiescent state is charged to |6 v.|. Transistor 40 is normally on, so that terminal 62 is substantially at ground potential.

The voltage function developed at the collector of transistor 38 (FIG. 2(C)) is applied to the electrolytic capacitor 48. This transient disturbance is passed through diode 50 to the base of transistor 40; the waveform to base of transistor 40 has the appearance of the voltage time function shown in FIG. 2(D). As the collector of transistor 38 becomes more negative i.e. heads toward its standby potential, the base voltage of transistor 40 becomes more negative i.e. it decays toward ground potential. The rate of decay of the voltage is a function of the RC time constant determined mainly by capacitor 56 and the resistor 58.

If at this time it is assumed that another input pulse 68 is applied to the input terminals 20, 22, the base voltage of transistor 40 fails to reach ground potential before the entire process is repeated. During that time, the output of the transistor 40 is negative i.e. —18 v., because the transistor is cut off and the collector 62 is at the bias potential.

However, if the train of input pulses (FIG. 2(A)) fails to arrive for a predetermined time period equal to $\tau$, then the base voltage does pass through 0 volts, becoming slightly negative, thereby causing transistor 40 to saturate. The collector of transistor 40 quickly rises toward ground potential (FIG. 2(E)). This positive step function voltage signal may be used to actuate an indicator which warns the operator that the circuit has not performed the last operation successfully. For example, the output signal (FIG. 2(E)) may be used to energize a signal light in a panel board.

The rise of the output voltage (FIG. 2(E)) has been idealized to some extent; in the practical situation, the rise of the positive step voltage is slightly inclined. This rise time may be improved by utilizing the embodiment shown in FIG. 3.

Figure 3:
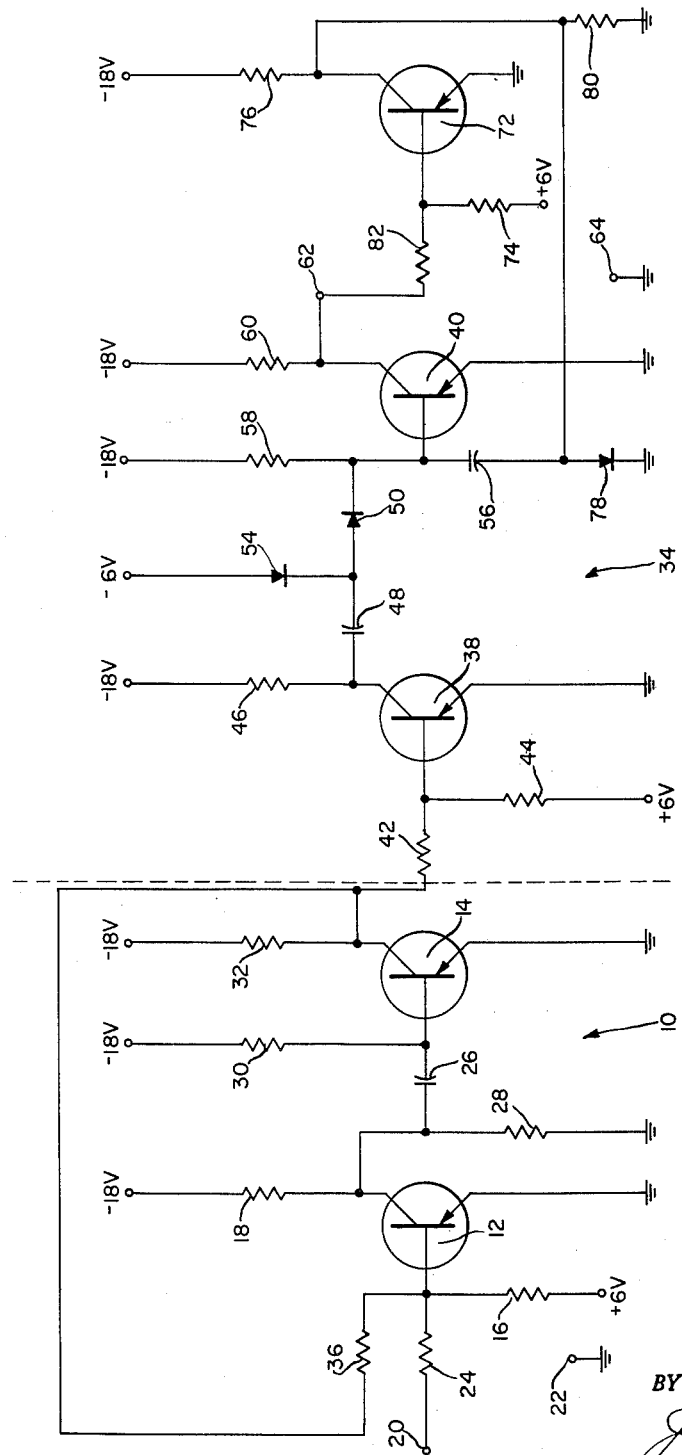
FIG. 3 is a circuit diagram of another illustrative embodiment in accordance with the invention.

The circuitry of FIG. 3 is substantially the same as that of FIG. 1. A transistor 72 arranged in the common emitter configuration provides an additional stage. Biasing potentials for the base and collector of this transistor are applied by means of resistors 74 and 76 respectively. A diode 78 is connected between one side of the capacitor 56 and ground, the cathode of the diode 78 being returned to ground. The collector of transistor 72 is connected to the anode of diode 78 to provide a feedback path. The diode 78 is shunted by resistor 80. The output terminal 62 is applied to the base of transistor 72 by means of resistor 82.

The output developed at the collector of transistor 40 is applied to the base of transistor 72. The collector voltage of transistor 72 is applied to the timing capacitor 56, thereby providing positive feedback to the base of transistor 40. The diode 78 insures a low impedance charging path for the capacitor 56. The resistor 80 is used as a load to limit the quiescent charge in the capacitor 56.

Obviously many modifications and variations of the present invention are possible in the light of the above teachings. It is therefore to be understood that within the scope of the appended claims the invention may be practiced other than as specifically described and illustrated.

What is claimed is:

1. Pulse train gap detection circuitry comprising first and second transistors, each having three electrodes, one of the electrodes of each transistor being a common or reference potential to the other two as regards the input and output respectively, the input to the first transistor being adapted to receive a train of pulse signals, coupling means connecting the output of the first transistor with the input of the second transistor, and timing circuit means comprising the combination of a first resistor in parallel with the serial connection of a capacitor and a diode, said diode having an anode and a cathode and being shunted by a second resistor, the cathode being connected to said reference potential, said combination being adapted to receive a source of electromotive force, a third transistor having three electrodes, one of which is a common or reference potential to the other two as regards input and output, the input of the third transistor being connected to the output of the second transistor, and having its own output connected to the anode of said diode to provide regenerative feedback to said timing circuit means, the detection circuit output being developed at the output of the second transistor.

2. Pulse train gap detection circuitry according to claim 1 wherein the coupling means comprises a second diode and a second capacitor connected in series, the cathode side of said second diode being connected to the input of the second transistor, and clamping means connected to the anode side of said second diode to clamp said anode at a fixed potential.

3. Pulse train gap detection circuitry comprising, first and second electronic amplifying means each having an input and an output, the input of the first electronic amplifying means being adapted to receive a train of pulse signals, coupling means connecting the output of the first electronic amplifying means with the input of the second electronic amplifying means, and timing circuit means comprising the combination of a first resistor in parallel with a serial union of a capacitor and a diode, said diode having an anode and a cathode and being shunted by a second resistor, the cathode being connected to the circuit ground, said combination being adapted to receive a source of electromotive force, said circuit means yieldingly arresting the decay of signal input to the second electronic amplifying means to inhibit a change in conduction thereof as a function of the time width between successive pulses, a third electronic amplifying means connected to the output of the second electronic amplifying means, the latter electronic amplifying means having its output connected to the anode of said diode to provide regenerative feedback to said timing circuit, the detection circuit output signal being developed at the output of the second electronic amplifying means.

References Cited in the file of this patent

UNITED STATES PATENTS

| | | |
|---|---|---|
| 2,632,810 | Nyman | Mar. 24, 1953 |
| 2,837,663 | Walz | June 3, 1958 |
| 2,863,052 | Fraser | Dec. 2, 1958 |
| 2,892,941 | Woestman et al. | June 30, 1959 |